United States Patent [19]
Beisch et al.

[11] 3,973,801
[45] Aug. 10, 1976

[54] WHEEL TRIM RETENTION MEANS

[75] Inventors: Hans R. Beisch, Amherstburg, Canada; Harold C. Marks, Northville, Mich.

[73] Assignee: Norris Industries, Inc., Ypsilanti, Mich.

[22] Filed: Feb. 13, 1975

[21] Appl. No.: 549,554

[52] U.S. Cl. .......................... 301/37 C; 301/37 SC; 301/37 R
[51] Int. Cl.² .......................................... B60B 7/00
[58] Field of Search ................. 280/156; 24/73 HC; 301/37 R, 37 ST, 37 P, 37 PB, 37 CD, 37 T, 37 L, 37 TP, 37 B, 37 C

[56] References Cited
UNITED STATES PATENTS

| | | | |
|---|---|---|---|
| 2,761,188 | 9/1956 | Bedford | 24/73 HC |
| 2,927,824 | 3/1960 | Simon | 301/37 CD |
| 2,934,376 | 4/1960 | Lyon | 301/37 PB |
| 3,860,296 | 1/1975 | Spisak | 301/37 R |

*Primary Examiner*—Allen N. Knowles
*Assistant Examiner*—D. W. Keen
*Attorney, Agent, or Firm*—Harness, Dickey & Pierce

[57] ABSTRACT

Means are disclosed for retaining wheel trim such as a trim ring or wheel cover. The means comprises an annular retention member secured at its outer edge to the wheel trim, and having an axially extending portion inside the conventional intermediate flange of the tire rim. A plurality of retaining clips are secured to this portion of the retention member and have fingers engaging the intermediate tire rim flange. The clips are easily assembled and locked onto the retention member by snap tabs. The construction avoids interference with the mounting of balancing weights on the lip flange of the tire rim.

13 Claims, 4 Drawing Figures

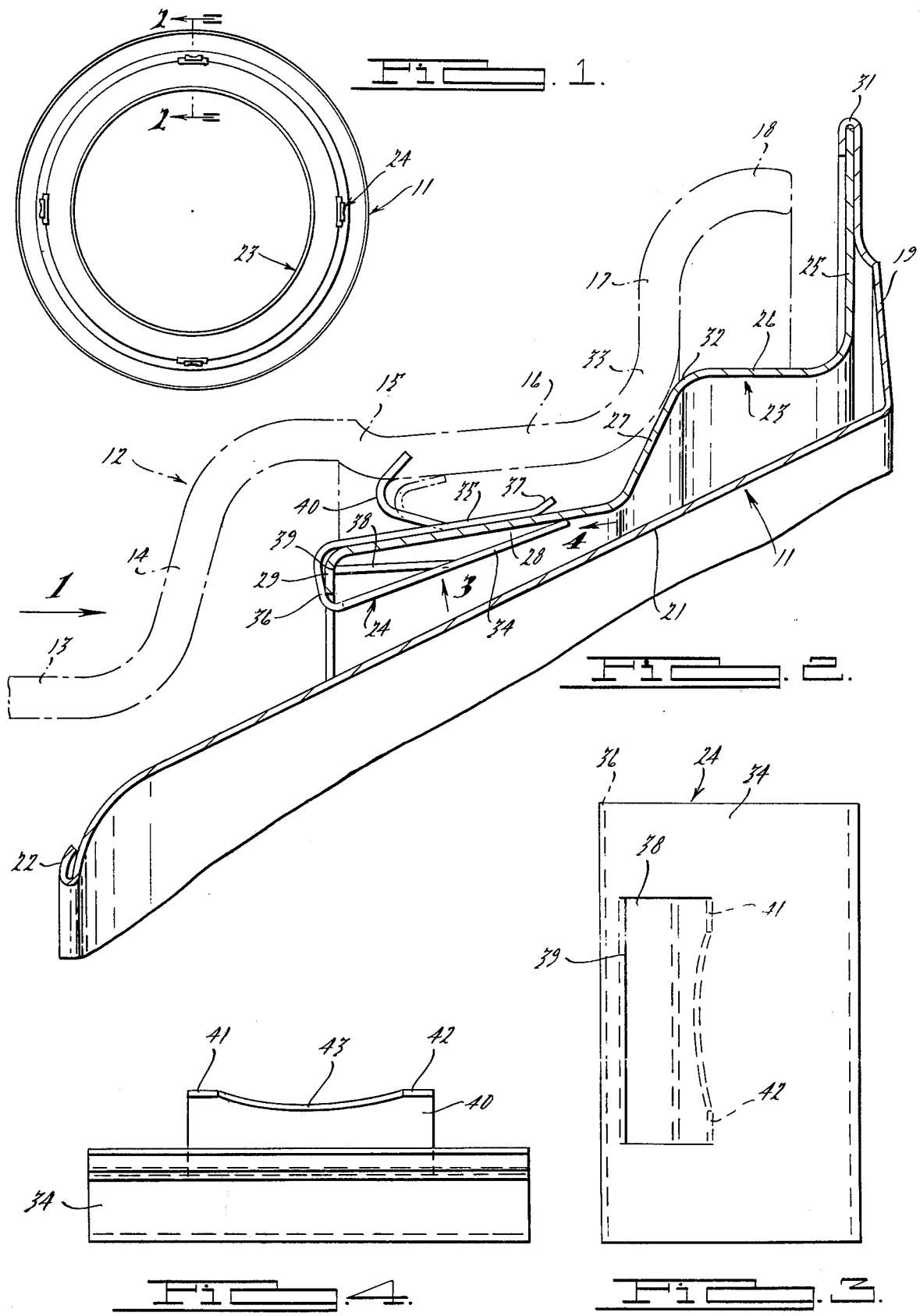

WHEEL TRIM RETENTION MEANS

BACKGROUND OF THE INVENTION

1. Field of the Invention

The invention relates to a mounting of trim rings and covers on automotive vehicle wheels, and expecially on tire rims having lip flanges to which balancing weights must sometimes be attached.

2. Description of the Prior Art

It is known to have annular retention members secured to trim rings or covers which have means for securing the retention members to the outer or lip flange of a tire rim. A drawback of such an arrangement is that the attaching means may occupy space needed for tire balance weights.

A number of prior constructions show wheel trim attached to retention members, with clips carried by the latter and engaging the inner axial surface of the tire rim, that is, the intermediate flange. Examples are U.S. Pat. Nos. 3,168,349; 3,174,803; 3,425,747; and 3,703,318. However, these prior constructions are relatively expensive to build and have other disadvantages, in terms of simplicity and reliability, which will become apparent below.

Other pertinent prior patents discovered during a search of the subject matter of this invention are U.S. Pat. Nos. 2,410,174; 3,415,575; and 3,757,400.

BRIEF SUMMARY OF THE INVENTION

It is an object of the present invention to provide a novel and improved vehicle wheel trim retainer which affords secure retention while still permitting full access to the outer lip flange of a tire rim for the purpose of mounting balance weights.

It is another object to provide an improved retention means of this character which permits mounting of a full wheel cover if desired, with means securing the cover to the intermediate flange of a tire rim.

It is a further object to provide an improved wheel trim retainer which is relatively simple and inexpensive to manufacture, may be easily mounted on or removed from a vehicle wheel, and assures strong and reliable retention.

It is another object to provide a trim ring and cover retainer which is quickly and easily assembled without requiring riveting or welding.

It is a further object to provide a retainer of this character which is especially adapted for light weight trim rings or covers used on automotive vehicles.

Other objects, features and advantages of the invention will become apparent from the following specification and claims.

Briefly, the illustrated embodiment of the invention comprises an annular retention member having an outer portion in spaced relation with the lip flange of a tire rim and an inner portion in spaced relation with the intermediate flange, means securing a wheel trim member to the outer portion of said retention member, a plurality of circumferentially spaced retaining clips carried by the inner portion of said retention member, resilient means on said clips engageable with the intermediate flange of the tire rim to hold the retention member against outward axial movement, and clip retention means comprising coacting elements on each retaining clip and said inner retention member portion, said clip retention means permitting movement of said clips onto said retention member but being responsive to said movement to prevent outward axial removal of the retention member from the clips and thereby hold said retention member and wheel trim on the tire rim.

BRIEF DESCRIPTION OF THE DRAWINGS

FIG. 1 is a side view of the retention means of this invention looking from inside the wheel in the direction of the arrow 1 of FIG. 2, the vehicle wheel itself not being shown.

FIG. 2 is an enlarged fragmentary cross-sectional view in elevation taken along the lines 2—2 of FIG. 1 and showing the construction of the retention means.

FIG. 3 is a plan view of the retaining clip taken in the direction of the arrow 3 of FIG. 2; and FIG. 4 is an end view of the clip taken in the direction of the arrow 4 of FIG. 2.

DESCRIPTION OF THE PREFERRED EMBODIMENT

The retention means is intended to hold wheel trim generally indicated at 11 onto a conventional vehicle tire rim the outer portion of which is generally indicated in dot-dash lines at 12. The wheel trim 11 may be either a trim ring or a wheel cover. The tire rim has an axially extending base flange 13, a radially outwardly extending side flange 14, a tire bead or groove 15 formed on an axially outwardly extending intermediate flange 16, a radially extending lip flange portion 17 and an axially extending lip flange portion 18. The lip flange is normally used to mount balance weights (not shown) and it is an object of this invention to leave this flange free for such use.

Wheel trim 11 is shown as having an outer radially extending portion 19 which is to be spaced axially outwardly from the lip flange portions 17, 18, a frustoconically shaped intermediate portion 21 extending axially and radially inwardly from portion 19 and spaced from tire rim 12, and a reversely bent inner portion 22. It will be understood, of course, that the invention could be used with wheel trim of other shapes.

The invention comprises a retention member generally indicated at 23 and a plurality of retaining clips each of which is generally indicated at 24. Retention member 23 is of annular shape and comprises a radially extending outer portion 25, in axial portion 26 extending inwardly from portion 25, a frustoconical portion 27 extending radially and axially inwardly from portion 26 at a relatively steep angle, a second frustoconical portion 28 extending from portion 27 at a lesser angle, and a radially inwardly extending flange 29 at the inner end of portion 28.

Outer portion 25 of retention member 23 supports wheel trim 11, being secured thereto by inturned flange 31 on the wheel trim which engage the outer edge of retention member portion 25. The juncture 32 between portions 26 and 27 of the retention member is engageable with the juncture 33 between portions 16 and 17 of the tire rim. This engagement serves to locate retention member 23 and its associated parts in an axial direction. The length of portion 26 of the retention member is such that when the member is so located, its portion 25 will be spaced a considerable distance from the tire rim lip flange, thus permitting full use of the lip flange for mounting balance weights.

The angle of retention member portion 27 is steep enough as to maintain portion 18 in inwardly spaced relation from intermediate flange 16 of the tire rim.

The length of portion 28 is such that the inturned flange 29 is spaced from side flange 14 of the rim.

Except for a valve stem access hole (not shown) retention member 23 need not be provided with any notches or apertures. The retention member is suitably fabricated of metal and is of sufficiently thin gage to reduce costs and render the flexibility necessary to accommodate the radially flexibility of the wheel.

Retaining clips 24 are preferably fabricated of spring-like material. Each clip is of generally rectangular shape as seen in FIG. 3, having two overlapping main portions, an inside portion 34 and an outside portion 35. These are connected by a web 36 which is bent so that the outer ends of portions 34 and 35 approach each other. The width of web 36 is slightly greater than that of flange 29. A lip 37 is bent outwardly from the edge of portion 35 to facilitate mounting of the clip on retention member 23 by spreading apart the clip.

Lip 24 is provided with a locking tab 38 which is partially severed from portion 34 and is bent at an angle toward portion 35. The outer edge 39 of tab 38 is spaced from flange 36 so that when the retaining clip is slipped over retention member flange 29, tab 38 will be deflected toward portion 34 until edge 39 passes flange 29. The tab will then snap into position behind flange 29 so that edge 39 abuts the flange, which will be held between tab 38 and flange 36 as seen in FIG. 2. Since the width of web 36 is only slightly greater than that of flange 29, clip 24 will be effectively prevented from both radial and axial movement with respect to retention member 23.

A spring-like holding finger 40 is partially severed from portion 35 of retaining clip 24 and extends toward the inner surface of intermediate flange 16. This finger is turned back on itself so that its inner portion extends axially inwardly and radially outwardly, and its outer portion extends axially and radially outwardly. A pair of teeth 41 and 42 are formed on the outer edge of finger 40, being separated by a recessed portion 43. When in operative position, with finger 40 flexed, teeth 41 and 42 will bite into the inner surface of intermediate flange 16 so as to resist axially outward movement of the assembly while resiliently supporting the parts in a radial direction. The flexed and gripping position of a finger 40 is shown in dot-dash lines in FIG. 2, with the unstressed position being shown in solid lines.

In operation, any desired number of retaining clips 24 may be mounted in circumferentially spaced relation on retention member 23, four such clips being shown in the drawing. The clips may be mounted simply by spreading portions 34 and 35 apart, and slipping them over flange 29 until locking tabs 38 snap into place behind the flange. The assembly then may be inserted in the tire rim so that fingers 40 are deflected and the teeth 41 and 42 engage the inner surface of intermediate flange 16. The mounting movement will continue until shoulder 32 of retention member 23 engages portion 33 of the tire rim. The retaining clips will then prevent unwanted removal of the assembly from the tire rim while at the same time the lip flange is left clear for balance weights. During operation of the vehicle, it is believed that the normal distortion of the tire rim into a generally oval shape is accommodated primarily by flexing of retention member 23 and possibly by flexing to some extent spring-like fingers 40.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

We claim:

1. Wheel trim retention means for mounting a wheel trim member on a tire rim of the type having a generally axially extending intermediate flange, comprising:
    an annular retention member connected to a wheel trim member and having a generally axially extending portion;
    a radially directed flange extending from the axially inner end of said retention member portion;
    a plurality of retaining clips mounted on said retention member, each retaining clip being formed of spring-like material and having opposed inner and outer elements connected by a web, said elements being spreadable so that the clip may be slipped over said retention member flange;
    a locking tab on one of said elements of each said clip extending into the space between said elements, the relative dimensions of the parts being such that said locking tab will snap into position behind said retention member flange when the clip is slipped onto the retention member; and
    a resilient retaining finger on each said clip having an outwardly facing edge, the unstressed shape of said finger being such that said edge will bite into the inner surface of said intermediate flange when the retention means is inserted into the tire rim.

2. Retention means as claimed in claim 1, wherein said locking tab cooperates with said retention member flange to mechanically lock said clip to said retention member.

3. Retention means as claimed in claim 2, wherein said mechanical lock is operable to prevent movement of said clip in an axially inwardly direction with respect to said retention member.

4. Retention means as claimed in claim 1, wherein said retention member flange extends in a generally radially inwardly direction from said retention member.

5. Retention means as claimed in claim 4, wherein said flange is annular in configuration and is continuous throughout its length.

6. Retention means as claimed in claim 1, wherein said locking tab is integral with said clip.

7. Retention means as claimed in claim 1, wherein said resilient retaining finger is integral with said clip.

8. Retention means as claimed in claim 1, wherein said locking tab is connected to said inner one of said elements of each said clip.

9. Retention means as claimed in claim 1, wherein said resilient retaining finger is disposed on said outer one of said elements of each said clip.

10. Retention means as claimed in claim 9, wherein said outer element of said clip lies against said generally axially extending portion of said retention member.

11. Retention means as claimed in claim 1, wherein said retention member is not integral with the wheel trim member.

12. Retention means as claimed in claim 1, wherein said resilient retaining finger is formed so as to initially extend generally axially inwardly and radially outwardly, and adjacent the end thereof to extend generally axially and radially outwardly.

13. Retention means as claimed in claim 12, wherein said edge is provided with a plurality of wheel rim engaging teeth.

* * * * *

UNITED STATES PATENT AND TRADEMARK OFFICE
CERTIFICATE OF CORRECTION

PATENT NO. : 3973801
DATED : August 10, 1976
INVENTOR(S) : Hans R. Beisch and Harold C. Marks It is certified that error appears in the above-identified patent and that said Letters Patent are hereby corrected as shown below:

Column 2, line 67, "18" should be --28--

Signed and Sealed this

Ninth Day of November 1976

[SEAL]

Attest:

RUTH C. MASON
*Attesting Officer*

C. MARSHALL DANN
*Commissioner of Patents and Trademarks*